United States Patent
Wang et al.

(10) Patent No.: US 11,824,213 B2
(45) Date of Patent: Nov. 21, 2023

(54) BATTERY UNIT, BATTERY MODULE AND VEHICLE

(71) Applicant: BYD COMPANY LIMITED, Guangdong (CN)

(72) Inventors: Xinyue Wang, Shenzhen (CN); Han Cheng, Shenzhen (CN); Yan Zhu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 227 days.

(21) Appl. No.: 17/425,914

(22) PCT Filed: Jan. 21, 2020

(86) PCT No.: PCT/CN2020/073533
§ 371 (c)(1),
(2) Date: Jul. 26, 2021

(87) PCT Pub. No.: WO2020/151709
PCT Pub. Date: Jul. 30, 2020

(65) Prior Publication Data
US 2022/0173464 A1  Jun. 2, 2022

(30) Foreign Application Priority Data
Jan. 26, 2019 (CN) .......................... 201910076293.4

(51) Int. Cl.
*H01M 50/176* (2021.01)
*H01M 50/15* (2021.01)
(Continued)

(52) U.S. Cl.
CPC ......... *H01M 50/176* (2021.01); *H01M 50/15* (2021.01); *H01M 50/50* (2021.01); *H01M 50/531* (2021.01); *H01M 2220/20* (2013.01)

(58) Field of Classification Search
CPC .. H01M 50/176; H01M 50/50; H01M 50/531; H01M 50/15; H01M 2220/20
See application file for complete search history.

(56) References Cited

U.S. PATENT DOCUMENTS

| | | | |
|---|---|---|---|
| 9,379,372 B2 | 6/2016 | Sasaki et al. | |
| 2012/0231305 A1* | 9/2012 | Guen | H01M 50/55 429/156 |

(Continued)

FOREIGN PATENT DOCUMENTS

| | | |
|---|---|---|
| CN | 101651229 A | 2/2010 |
| CN | 101926021 A | 12/2010 |

(Continued)

OTHER PUBLICATIONS

WO2018012728MT (Year: 2018).*

(Continued)

*Primary Examiner* — Alexander Usyatinsky
(74) *Attorney, Agent, or Firm* — CALFEE, HALTER & GRISWOLD LLP

(57) ABSTRACT

The present application provides a battery unit, a battery module, and a vehicle. The battery unit includes a housing, a cover plate, a first battery post, a second battery post, and an electrode core. The housing is provided with an opening. The cover plate covers the opening. The electrode core is disposed inside the housing. The cover plate includes a cover plate body and a concave cavity portion that is concave inward relative to an outer surface of the cover plate body. The first battery post is accommodated in the concave cavity portion. A first electrode tab of the electrode core is electrically connected to the first battery post. The second battery post is electrically connected to the cover plate body. A second electrode tab of the electrode core is electrically connected to the cover plate body.

20 Claims, 3 Drawing Sheets

(51) Int. Cl.
H01M 50/531    (2021.01)
H01M 50/50    (2021.01)

(56) References Cited

U.S. PATENT DOCUMENTS

| | | |
|---|---|---|
| 2012/0315516 A1 | 12/2012 | Kim |
| 2016/0049634 A1 | 2/2016 | Hwang et al. |
| 2016/0093933 A1* | 3/2016 | Iida ............... H01M 10/615 |
| | | 429/71 |
| 2016/0351980 A1* | 12/2016 | Herntier ............ H01M 10/6568 |
| 2017/0018794 A1 | 1/2017 | Lee et al. |

FOREIGN PATENT DOCUMENTS

| | | |
|---|---|---|
| CN | 201789007 U | 4/2011 |
| CN | 102544424 A | 7/2012 |
| CN | 204946950 U | 1/2016 |
| CN | 106356490 A | 1/2017 |
| CN | 206727177 * | 1/2017 |
| CN | 206727177 U | 12/2017 |
| CN | 207818737 U | 9/2018 |
| CN | 109065771 A | 12/2018 |
| EP | 3486990 A1 | 5/2019 |
| EP | 3486990 A4 | 1/2020 |
| JP | 08102314 A | 4/1996 |
| JP | 2010045020 A | 2/2010 |
| JP | 2014032967 A | 2/2014 |
| KR | 1020180007242 A | 1/2018 |
| WO | 2018012728 A1 | 1/2018 |
| WO | WO2018012728 * | 1/2018 |
| WO | 2018107436 A1 | 6/2018 |

OTHER PUBLICATIONS

CN 206727177MT (Year: 2018).*
The Decision to grant a Patent issued by JPO for Application No. 2021-543208 (dated 2023).*
International Search Report of PCT/CN2020/073533 dated Apr. 23, 2020 (3 pages).

* cited by examiner

BATTERY UNIT, BATTERY MODULE AND VEHICLE

CROSS-REFERENCE TO RELATED APPLICATIONS

This application is a National Stage of PCT Application No. PCT/CN2020/073533, filed Jan. 21, 2020, which claims priority to Chinese Patent Application No. 201910076293.4, entitled "BATTERY UNIT, BATTERY MODULE, AND VEHICLE" and filed by BYD Co., Ltd. on Jan. 26, 2019. All of these applications are incorporated by referenced herein their entirety.

FIELD

The present application relates to the field of batteries, and specifically to a battery unit, a battery module, and a vehicle.

BACKGROUND

With the development of science and technology, various electronic devices and electric tools such as mobile phones and electric vehicles have been widely used. A battery is a core component, and the performance of the battery significantly affects the overall performance and use experience. In particular, the capacity of the battery determines the overall battery life and therefore is a major concern of users.

The battery includes a housing and an electrode core disposed inside the housing. The volume of a battery unit somewhat determines the volume of the electrode core, and significantly determines the capacity of the battery. In electronic devices and electric tools, a mounting environment for a battery basically determines the size of space to be occupied by the battery, and it is hardly feasible to endlessly increase the overall volume of the battery. Therefore, the capacity of the battery is also limited.

SUMMARY

An objective of the present application is to provide a battery unit, to increase the capacity of a battery due to the limitation of space.

To achieve the foregoing objective, the present application provides a battery unit. The battery unit includes a housing, a cover plate, a first battery post, a second battery post, and an electrode core. The housing is provided with an opening, the cover plate covers the opening, the electrode core is disposed inside the housing, the cover plate includes a cover plate body and a concave cavity portion that is concave inward relative to an outer surface of the cover plate body, the first battery post is accommodated in the concave cavity portion, a first electrode tab of the electrode core is electrically connected to the first battery post, the second battery post is electrically connected to the cover plate body, and a second electrode tab of the electrode core is electrically connected to the cover plate body.

In some embodiments, the electrode core includes an electrode core body provided with a capacity expansion end, the capacity expansion end is provided with a battery post adaptation region and a capacity expansion region protruding relative to the battery post adaptation region, the battery post adaptation region is concave relative to the capacity expansion region to form a battery post mounting space, the first battery post passes through the concave cavity portion and extends toward the battery post adaptation region, the first battery post and the concave cavity portion are at least partially disposed in the battery post mounting space, the capacity expansion region is aligned with the cover plate body, and the second battery post is disposed at a position, corresponding to the capacity expansion region, on the cover plate body.

In some embodiments, the battery post adaptation region surrounds the capacity expansion region.

In some embodiments, the concave cavity portion includes a tubular side wall and an annular bottom wall, and the first battery post extends into the tubular side wall and passes through the annular bottom wall.

In some embodiments, a filler is disposed between the first battery post and the tubular side wall.

In some embodiments, the first electrode tab is located in the battery post adaptation region, and the second electrode tab is located in the capacity expansion region.

In some embodiments, the first electrode tab and the electrode core body are integrally formed, and the second electrode tab and the electrode core body are integrally formed.

In some embodiments, an inner side of the concave cavity portion is provided with an inner lead-out sheet connected to the first battery post, and the first battery post is electrically connected to the first electrode tab by the inner lead-out sheet.

In addition, the present application provides a battery module, including the battery unit according to the foregoing solution.

In addition, the present application further provides a vehicle, including at least one battery module according to the foregoing solution.

Through the foregoing technical solution, according to one aspect, the first battery post is lowered and accommodated in the concave cavity portion. According to another aspect, the second battery post is electrically connected to the cover plate body, which does not require an insulation member, thereby reducing the overall height of the second battery post relative to the cover plate body. The inner volume of the battery unit is increased, and the electrode core is allowed to have a larger volume, so that the capacity of the battery unit can be increased.

The additional aspects and advantages of the present application will be set forth in part in the description below, parts of which will become apparent from the description below, or will be understood by the practice of the present application.

DESCRIPTIONS OF REFERENCE NUMERALS

Figure 1:
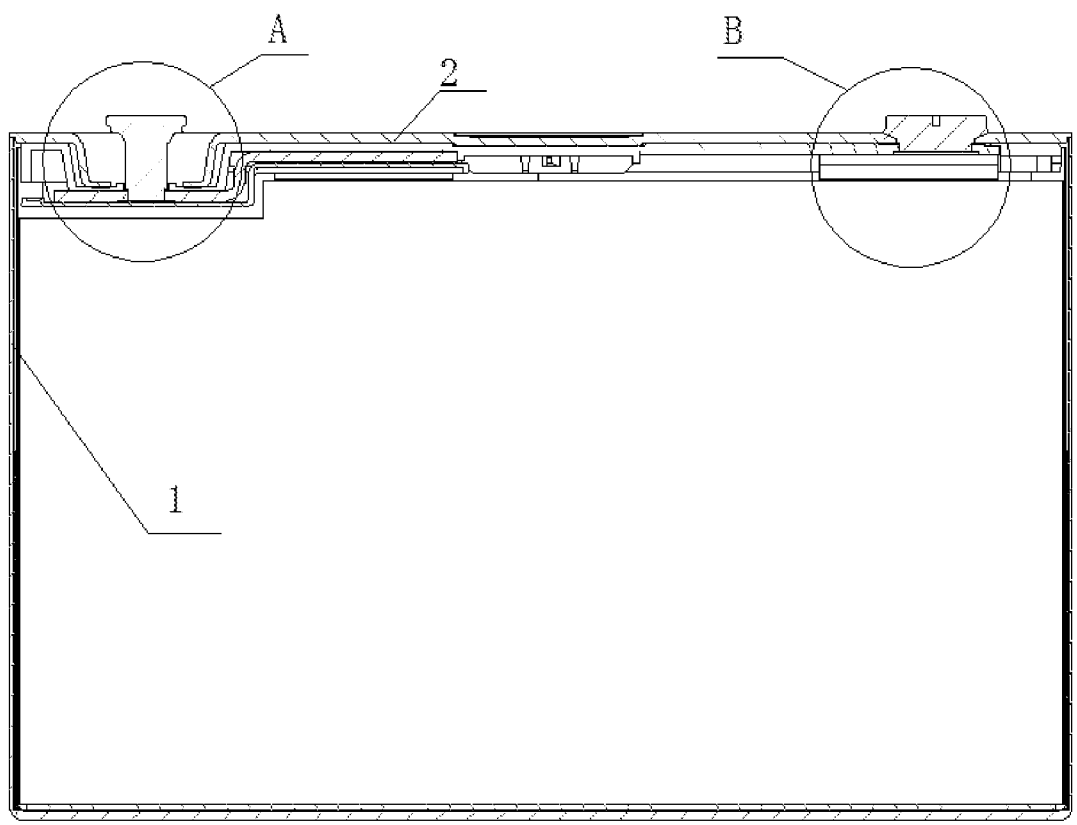
FIG. 1 is a cross-sectional view of an integral structure of a battery unit according to an embodiment of the present application.

Housing—1, cover plate—2, cover plate body—21, concave cavity portion—22, first battery post—31, second battery post—32, electrode core—4, capacity expansion end—41, battery post adaptation region—42, capacity expansion region—43, battery post mounting space—44, and inner lead-out sheet—5.

DETAILED DESCRIPTION

Detailed description of the embodiments of the present application will be made in the following, and examples thereof are illustrated in the accompanying drawings, throughout which identical or similar elements or elements of identical or similar functions are represented with identical or similar reference numerals. The following embodiments described with reference to the accompanying drawings are exemplary, and are intended to describe the present application and cannot be construed as a limitation to the present application.

The present application provides a battery unit, including a housing 1, a cover plate 2, a first battery post 31, a second battery post 32, and an electrode core 4. The housing 1 is provided with an opening. The cover plate 2 covers the opening. The electrode core 4 is disposed inside the housing 1. The cover plate 2 includes a cover plate body 21 and a concave cavity portion 22 that is concave inward relative to an outer surface of the cover plate body 21. The first battery post 31 is accommodated in the concave cavity portion 22. A first electrode tab of the electrode core 4 is electrically connected to the first battery post 31. The second battery post 32 is electrically connected to the cover plate body 21. A second electrode tab of the electrode core 4 is electrically connected to the cover plate body 21.

The outer surface of the cover plate body 21 is an upper surface of the cover plate body 21 shown in FIG. 1, that is, a surface of the cover plate body 21 away from an outer side of the electrode core 4 of the battery unit. In some embodiments, the cover plate body 21 is generally flat. In this case, the outer surface of the cover plate body 21 is the uppermost surface of the cover plate body. The concave cavity portion is concave toward the electrode core 4 relative to an uppermost side surface of the battery unit.

As shown in FIG. 1, FIG. 2, FIG. 3, FIG. 4, and FIG. 5, the cover plate body 21 is generally flat. The concave cavity portion 22 is concave relative to the cover plate body 21. The first battery post 31 is accommodated in the concave cavity portion 22 and may be connected to an electric device. In the related art, the cover plate body 21 is generally flat. The first battery post 31 passes through the cover plate body 21 to extend to the outside. In contrast, according to the present application, the overall height of the cover plate 2 is increased to increase the volume of a cavity formed by the housing 1 and the cover plate 2, which helps to increase the volume of the electrode core 4 to implement capacity expansion. According to one aspect, the first battery post 31 is lowered and accommodated in the concave cavity portion 22. According to another aspect, the second battery post 32 is electrically connected to the cover plate body 21, which does not require an insulation member, thereby reducing the overall height of the second battery post 32 relative to the cover plate body 21. The inner volume of the battery unit is increased, and the electrode core 4 is allowed to have a larger volume, so that the capacity of the battery unit can be increased.

Figure 3:
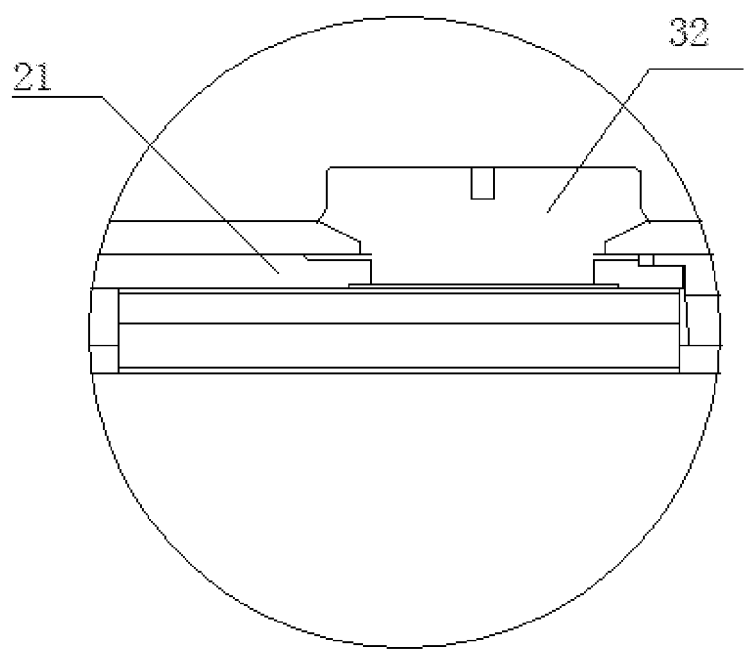
FIG. 3 is an enlarged view of a portion B in FIG. 1.
Figure 4:
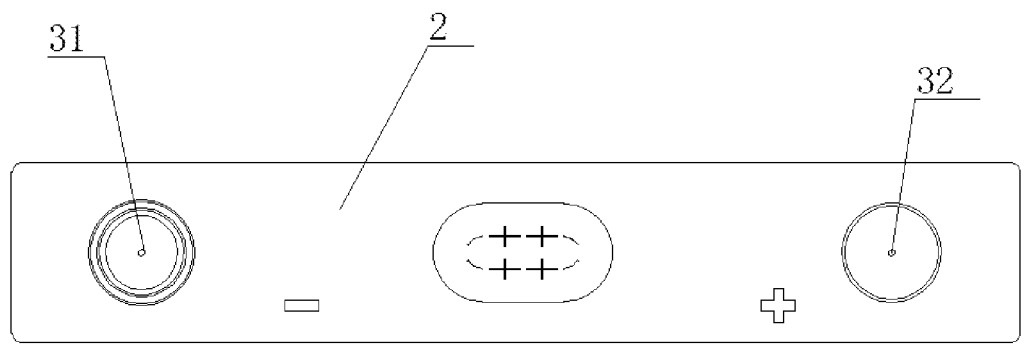
FIG. 4 is a top view of a battery unit according to an embodiment of the present application.
Figure 5:
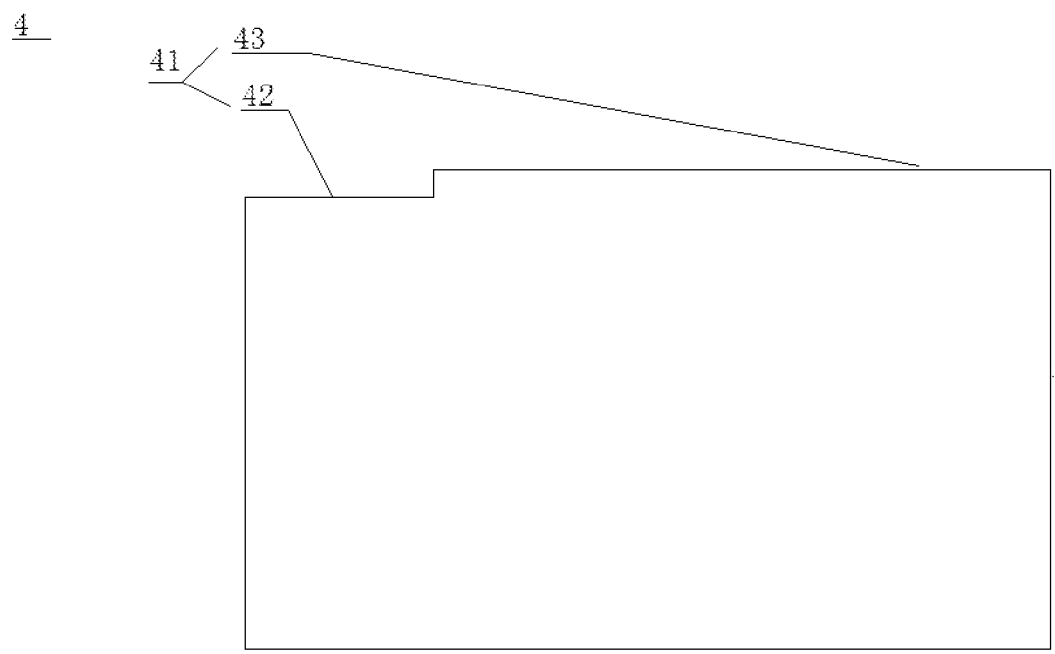
FIG. 5 is a schematic structural side view of an electrode core according to an embodiment of the present application.

In an embodiment of the present application, as shown in FIG. 3 and FIG. 4, the second battery post 32 is directly electrically connected to the cover plate body 21. In this case, during a specific implementation, the second battery post 32 and the cover plate body 21 may be directly welded without an additional insulation member (for example, a ceramic member), so that the overall height of the second battery post 32 can be effectively reduced, so as to reduce a height space in a battery pack body. More electrode cores 4 can be disposed in a space with a limited height, thereby improving a cell volume of the battery unit.

In an embodiment of the present application, the first battery post 31 having an insulation member (for example, a ceramic member) is lowered and disposed in the concave cavity portion 22. The second battery post 32 without an insulation member is directly electrically connected to the cover plate body 21. Neither the first battery post 31 nor the second battery post 32 occupies a space of the battery unit in a height direction, thereby effectively improving the space utilization and the capacity of the battery unit.

Figure 2:
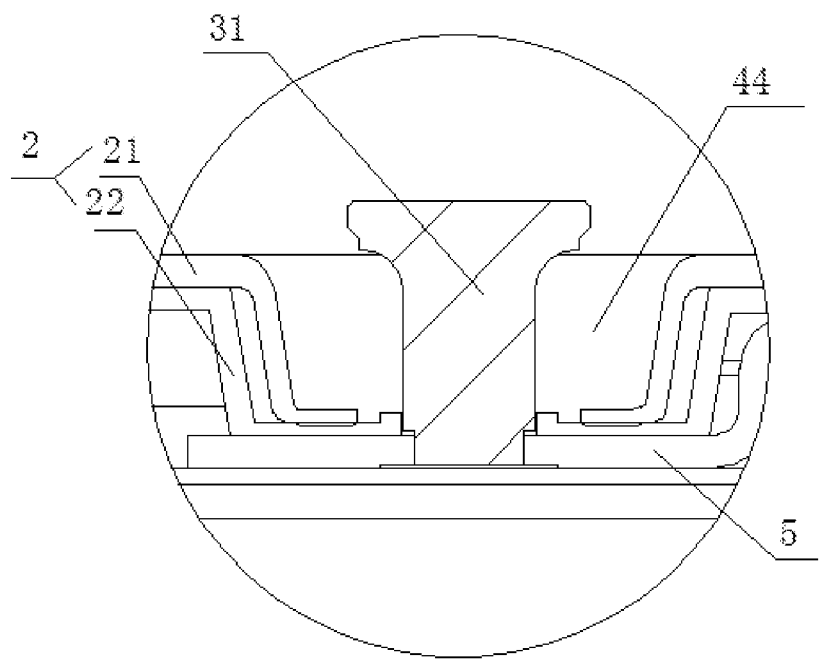
FIG. 2 is an enlarged view of a portion A in FIG. 1.

In some embodiments, as shown in FIG. 1 and FIG. 2, the electrode core 4 includes an electrode core body provided with a capacity expansion end 41. The capacity expansion end 41 is provided with a battery post adaptation region 42 and a capacity expansion region 43 protruding relative to the battery post adaptation region 42. The battery post adaptation region 42 is concave relative to the capacity expansion region 43 to form a battery post mounting space 44. The first battery post 31 passes through the concave cavity portion 22 and extends toward the battery post adaptation region 42. The first battery post 31 is at least partially disposed in the battery post mounting space 44. The capacity expansion region 43 is aligned with the cover plate body 21. The second battery post 32 is disposed at a position, corresponding to the capacity expansion region 43, on the cover plate body 21.

The capacity expansion end 41 is covered by the cover plate 2. A region of the capacity expansion end 41 occupied by the first battery post 31 and the concave cavity portion 22 is the battery post adaptation region 42. A region of the capacity expansion end 41 not occupied by the first battery post 31 and the concave cavity portion 22 protrudes toward the cover plate 2 to form the capacity expansion region 43, so that the volume of the electrode core body is increased, so as to implement capacity expansion. The battery post adaptation region 42 is concave relative to the capacity expansion region 43 to form the battery post mounting space 44. The first battery post 31 is at least partially accommodated in the battery post mounting space 44.

In addition, the concave cavity portion 22 is at least partially accommodated in the battery post mounting space 44.

The battery post adaptation region 42 surrounds the capacity expansion region 43. The battery post adaptation region 42 is disposed between two capacity expansion regions 43. A generally cylindrical concave cavity portion 22 may be accommodated in the battery post mounting space 44 between the two capacity expansion regions 43. The battery post mounting space 44 generally has a hexahedral shape. In some embodiments, to increase the volume of the electrode core body, the generally cylindrical battery post mounting space 44 may be formed. That is, the battery post adaptation region 42 surrounds the capacity expansion region 43 to define a concave with a circular section to accommodate the cylindrical concave cavity portion 22.

In some embodiments, the concave cavity portion 22 includes a tubular side wall and an annular bottom wall. The first battery post 31 extends into the tubular side wall and passes through the annular bottom wall. As shown in FIG. 2, the concave cavity portion 22 is jointly formed by the tubular side wall and the annular bottom wall. The annular bottom wall is provided with a through hole to allow the first battery post 31 to pass through. The shape of the concave cavity portion 22 corresponds to a cylindrical shape of the first battery post 31, so that a volume occupied by the concave cavity portion 22 can be fully reduced. Certainly, the first battery post 31 may be alternatively formed in another shape, for example, a hexagonal prism shape or a cuboidal shape.

In some embodiments, a filler is disposed between the first battery post 31 and the tubular side wall. The first battery post 31 and the tubular side wall are isolated by a filler. The filler may be made of an insulating material. The filler may be elastic to buffer the first battery post 31 and the tubular side wall.

In an embodiment of the present application, the first electrode tab is located in the battery post adaptation region 42, and the second electrode tab is located in the capacity expansion region 43. The first electrode tab led out from the battery post adaptation region 42 is electrically connected to the first battery post 31. The second electrode tab led out from the capacity expansion region 43 is electrically connected to the second battery post 32. Generally, after being led out, the first electrode tab and the second electrode tab both extend upward to positions at which the first electrode tab and the second electrode tab are electrically connected to the first battery post 31 and the second battery post 32, so that the space can be effectively saved and the costs can be effectively reduced, and a manufacturing process is simple.

In some embodiments, the first electrode tab and the electrode core body are integrally formed. The second electrode tab and the electrode core body are integrally formed. The first electrode tab and the electrode core body are integrally formed by using the material of the electrode core 4. The second electrode tab and the electrode core body are integrally formed by using the material of the electrode core 4. The first electrode tab may be one of a positive electrode and a negative electrode, and the second electrode tab is the other of the positive electrode and the negative electrode.

As described above, the first battery post 31 is connected to the first electrode tab. The first battery post 31 and the first electrode tab may be directly connected or may be connected by another structure.

In some embodiments, an inner side of the concave cavity portion 22 is provided with an inner lead-out sheet 5 connected to the first battery post 31. The first battery post 31 is electrically connected to the first electrode tab by the inner lead-out sheet 5.

As shown in FIG. 2, the inner side of the concave cavity portion 22 is a side facing the electrode core 4. The concave cavity portion 22 is disposed in the battery post adaptation region 42. The inner lead-out sheet 5 may be attached to the annular bottom wall of the concave cavity portion 22. The first battery post 31 is connected to the inner lead-out sheet 5 and electrically connected to the first electrode tab located in the battery post adaptation region 42 by the inner lead-out sheet 5.

In addition, the present application further provides a battery module, including the battery unit according to the foregoing solution. The battery module may include a plurality of battery units, and the plurality of battery units may be connected together in series or parallel to supply power.

In addition, the present application further provides a vehicle, including at least one battery module according to the foregoing solution.

In the description of the present application, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present application and simplifying the description, rather than indicating or implying that the apparatus or element should have a particular orientation or be constructed and operated in a particular orientation, and therefore, should not be construed as a limitation on the present application.

In addition, the terms "first" and "second" are used for descriptive purposes only and are not to be construed as indicating or implying relative importance or implicitly indicating the number of technical features indicated. Therefore, features defining "first" and "second" may explicitly or implicitly include one or more such features. In the descriptions of the present application, unless otherwise explicitly specified, "a plurality of" means more than two.

In the present application, unless expressly stated and defined otherwise, the terms "mounting", "connected", "connection", "fixed", etc. are to be construed broadly, for example, as fixed connection, detachable connection or integral connection, as mechanical connection or electrical connection, and as direct connection or indirect connection via an intermediary or communication inside two elements or interaction between two elements. Persons of ordinary skill in the art may understand the specific meanings of the foregoing terms in the present application according to specific situations.

In the present application, unless explicitly specified or limited otherwise, a first feature "on" or "under" a second feature may be the first feature in direct contact with the second feature, or the first feature in indirect contact with the second feature by using an intermediate medium. Moreover, the first feature "over", "above", and "up" the second feature may be that the first feature is directly above or obliquely above the second feature, or simply indicates that a horizontal height of the first feature is higher than that of the second feature. The first feature "under", "below", and "down" the second feature may be that the first feature is directly below or obliquely below the second feature, or simply indicates that a horizontal height of the first feature is less than that of the second feature.

In description of the present disclosure, description of reference terms such as "one embodiment", "some embodiments", "example", "specific example", or "some examples" means including specific features, structures, materials, or features described in the embodiment or example in at least one embodiment or example of the present application. In this specification, schematic representations of the above terms are not necessarily directed to the same embodiments or examples. Moreover, the specific features, structures, materials, or characteristics described may be combined in any one or more embodiments or examples in an appropriate manner. In addition, different embodiments or examples described in this specification, as well as features of different embodiments or examples, may be integrated and combined by those skilled in the art without contradicting each other.

Although the embodiments of the present application have been shown and described above, it may be understood that the above embodiments are exemplary and should not be construed as a limitation on the present application, and a person skilled in the art may make changes, modifications, replacements and variations to the above embodiments within the scope of the present application.

What is claimed is:

1. A battery unit, comprising a housing, a cover plate, a first battery post, a second battery post, and an electrode core, wherein the housing is provided with an opening, the cover plate covers the opening, the electrode core is disposed inside the housing, the cover plate comprises a cover plate body and a concave cavity portion that is concave inward relative to an outer surface of the cover plate body, the first battery post is accommodated in the concave cavity portion, a first electrode tab of the electrode core is electrically connected to the first battery post, the second battery post is electrically connected to the cover plate body, and a second electrode tab of the electrode core is electrically connected to the cover plate body, wherein the concave cavity portion extends downward from the cover plate body to define an increased height of the cover plate such that the housing and the cover plate define an increased volume for retaining the electrode core.

2. A battery unit, comprising a housing, a cover plate, a first battery post, a second battery post, and an electrode core, wherein the housing is provided with an opening, the cover plate covers the opening, the electrode core is disposed inside the housing, the cover plate comprises a cover plate body and a concave cavity portion that is concave inward relative to an outer surface of the cover plate body, the first battery post is accommodated in the concave cavity portion, a first electrode tab of the electrode core is electrically connected to the first battery post, the second battery post is electrically connected to the cover plate body, and a second electrode tab of the electrode core is electrically connected to the cover plate body, wherein the electrode core comprises an electrode core body provided with a capacity expansion end, the capacity expansion end is provided with a battery post adaptation region and a capacity expansion region protruding relative to the battery post adaptation region, the battery post adaptation region is concave relative to the capacity expansion region to form a battery post mounting space, the first battery post passes through the concave cavity portion and extends toward the battery post adaptation region, the first battery post is at least partially disposed in the battery post mounting space, the capacity expansion region is aligned with the cover plate body, and the second battery post is disposed at a position, corresponding to the capacity expansion region, on the cover plate body.

3. The battery unit according to claim 2, wherein the battery post adaptation region surrounds the capacity expansion region.

4. The battery unit according to claim 3, wherein the concave cavity portion comprises a tubular side wall and an annular bottom wall, and the first battery post extends into the tubular side wall and passes through the annular bottom wall.

5. The battery unit according to claim 4, wherein a filler is disposed between the first battery post and the tubular side wall.

6. The battery unit according to claim 2, wherein the first electrode tab is located in the battery post adaptation region, and the second electrode tab is located in the capacity expansion region.

7. The battery unit according to claim 2, wherein the first electrode tab and the electrode core body are integrally formed, and the second electrode tab and the electrode core body are integrally formed.

8. The battery unit according to claim 1, wherein an inner side of the concave cavity portion is provided with an inner lead-out sheet connected to the first battery post, and the first battery post is electrically connected to the first electrode tab by the inner lead-out sheet.

9. A battery module, comprising the battery unit according to claim 1.

10. A vehicle, comprising at least one battery module according to claim 9.

11. The battery unit according to claim 3, wherein the first electrode tab is located in the battery post adaptation region, and the second electrode tab is located in the capacity expansion region.

12. The battery unit according to claim 4, wherein the first electrode tab is located in the battery post adaptation region, and the second electrode tab is located in the capacity expansion region.

13. The battery unit according to claim 5, wherein the first electrode tab is located in the battery post adaptation region, and the second electrode tab is located in the capacity expansion region.

14. The battery unit according to claim 3, wherein the first electrode tab and the electrode core body are integrally formed, and the second electrode tab and the electrode core body are integrally formed.

15. The battery unit according to claim 4, wherein the first electrode tab and the electrode core body are integrally formed, and the second electrode tab and the electrode core body are integrally formed.

16. The battery unit according to claim 5, wherein the first electrode tab and the electrode core body are integrally formed, and the second electrode tab and the electrode core body are integrally formed.

17. The battery unit according to claim 6, wherein the first electrode tab and the electrode core body are integrally formed, and the second electrode tab and the electrode core body are integrally formed.

18. The battery unit according to claim 13, wherein the first electrode tab and the electrode core body are integrally formed, and the second electrode tab and the electrode core body are integrally formed.

19. The battery unit according to claim 2, wherein an inner side of the concave cavity portion is provided with an inner lead-out sheet connected to the first battery post, and the first battery post is electrically connected to the first electrode tab by the inner lead-out sheet.

20. The battery unit according to claim 18, wherein an inner side of the concave cavity portion is provided with an inner lead-out sheet connected to the first battery post, and the first battery post is electrically connected to the first electrode tab by the inner lead-out sheet.

* * * * *